UNITED STATES PATENT OFFICE.

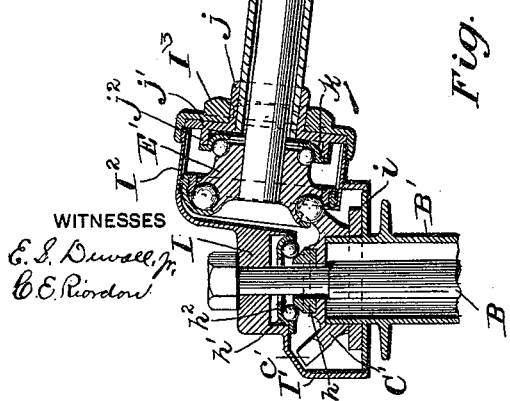

HENRY B. KEIPER, OF LANCASTER, PENNSYLVANIA.

GEARING.

SPECIFICATION forming part of Letters Patent No. 667,659, dated February 5, 1901.

Application filed September 25, 1897. Renewed January 8, 1901. Serial No. 42,558. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Gearing; and I do hereby declare the following to be a full, clear, and exact description of the invention, such as will enable others skilled in the art to which it appertains to make and use the same.

This invention relates to gearing designed more particularly for transmitting rotary motion between two parallel shafts at a considerable distance apart—as, for example, the crank-shaft and the wheel-shaft of a bicycle—although it is not limited to this particular form of gearing.

The main object is to reduce friction to the minimum while preserving an effective engagement between the members of the gearing for transmission of power; and to this end the invention provides a practical mode of employing rollers in the gearing where contact is had between the members thereof for transmission of movement, convenience in assembling the parts, compactness thereof when assembled, and complete protection from dust being desiderata to which due regard has been paid.

With the above-stated objects in view the invention may be said to consist in the novel features of construction and combinations of parts which are specifically described hereinafter, the essential elements being recited in the appended claims.

The drawings which accompany and form part of this specification illustrate an embodiment of the invention.

Of said drawings, Figure 1 represents a longitudinal section of the complete gearing. Fig. 2 represents a face view of one of the toothed gear-wheels. Fig. 3 represents a face view of one of the ball-carrying gear-wheels. Figs. 4 and 5 represent, respectively, a face view and a central section of a ball-retainer employed in connection with the gear-wheel shown in Fig. 3; and Fig. 6 is a section on the line VI VI of Fig. 1.

I have here chosen to illustrate and describe the invention embodied in bicycle-gearing, and the letter A designates the crank-shaft of a bicycle; A', the crank fastened thereto; $A^2$, the crank-hanger; B, the fixed axle of the rear wheel, and B' the hub of the rear wheel. Fastened to the shaft A and the hub B', respectively, are bevel-wheels C and C' of disk form, dished and cut with teeth $c$ and $c'$, which are concaved in their confronting sides, as clearly shown in Fig. 2 at $c^2$, the inner sides or bottoms of the spaces between the teeth being also concaved, as shown at $c^3$. A shaft D extends obliquely between said wheels, projecting over the inner side of the wheel C and over the outer side of the wheel C', and said shaft carries at its ends bevel gear-wheels E and E', coacting with the wheels C and C', respectively. The beveled face of each of said wheels E and E' is formed with a series of equidistant sockets $e$ of partly-spherical contour and also with an encircling groove $e'$, extending through said sockets, but not of the full depth of the same. Balls F are seated loosely in the sockets $e$ and take the place of teeth on the wheel, the said balls projecting from the beveled face of the wheel for engagement with the teeth $c$ or $c'$ of the coacting wheel C or C'. The groove $e'$ permits an elongation of said teeth to such an extent as to cause their engagement with as much as two-thirds of the peripheral surface of the balls, whereby a very effective intermeshing for transmission of power is insured. The concavities in the confronting sides of the teeth and the bottom sides of the spaces between the same permit a close engagement of the teeth with the balls, as will be apparent.

The bearing for that end of the crank-shaft appearing in the drawings comprises a cone $a$, fastened on said shaft, a ball-race $a'$, fitted in the end of the crank-hanger $A^2$, and balls $a^2$, interposed between said cone and said ball-race.

The crank-hanger is formed integral with a gear-casing comprising a flattened portion G, inclosing the wheel B, and a cylindrical portion G', inclosing the wheel E, and having exterior screw-threads for engagement of interior screw-threads of a cap $G^2$, applied over the end of the cylindrical portion of the casing. Said cap has an interiorly-screw-threaded central portion or boss $g$, which receives one screw-threaded end of a tubular casing H, inclosing the shaft D. The bearing for the front end of the latter comprises the tapered and grooved rear end $d$ of the wheel E, a set of balls $d'$ in the groove thereof, and a ball-race $d^2$, held in place by an inwardly-projecting flange $d^3$ of the cap $G^2$.

The power-transmitting balls F are loosely confined in the sockets of the wheel E by parts associated with the casing as follows: A ring $f$ embraces the wheel at the base of its beveled face, and a retaining cup or shell $f'$ is applied over said beveled face and is coupled with said ring by means of screw-threads, as shown. Said cup or shell is formed to extend over the balls and with its edges close to the periphery of the wheel, and it is held from rotation by means of a number of lugs $f^2$, formed upon it and engaging longitudinal grooves $f^3$ in the inner wall of the cylindrical portion of the casing. The cup or shell constitutes in itself a casing completely closing in the balls over the greater portion of the periphery of the wheel; but where it comes opposite the wheel B said shell is made with an opening $f^4$ of sufficient extent to permit the teeth of said wheel B to pass freely into and out of engagement with the balls; but the latter are always confined to the wheel E, though at all times free to turn.

The mode of connection between the ball-retainer and the outside casing above described is advantageous in that it permits sufficient play between these parts to prevent any binding of the retainer on the balls should the frame of the machine spring or twist.

The bearing for the hub B' of the rear wheel comprises a cone $h$, fastened to the wheel C', a ball-race $h'$, held in place by an internal shoulder or flange of a casing inclosing the gears, and a row of balls $h^2$, interposed between the said cone and ball-race. The casing above mentioned comprises a central portion or boss I, embracing the axle B, a cylindrical portion I', encircling the wheel C' and closed by a flange $i$ on the hub B', and a cylindrical portion $I^2$, encircling the wheel E and closed by a screw-cap $I^3$. The latter receives the rear end of the tube H, a bushing $j$ being interposed and formed integral with a disk $j'$, extending over the inner side of the cap and having a flange $j^2$, which holds in place a ball-race K. The bearing for the rear end of the shaft D is substantially the same as that for its front end, and the same remark applies to the means for confining the power-transmitting balls in the wheel E', and a repetition of the description already given is deemed unnecessary.

It will be seen that the above-described construction of parts permits their ready assemblage and effects a compact arrangement in which the working parts are thoroughly protected.

It will be understood that the casings are properly divided to permit their being placed around the gears.

It will thus be seen that the objects, primarily stated, are fully attained by the form of embodiment of the invention here shown and described. It is, however, to be understood that other forms of embodiment may be resorted to without departing from the spirit and scope of my invention.

Having thus fully described my invention, what I claim as new, and desire to secure by Letters Patent of the United States, is—

1. Gearing comprising a member having a series of spheroidal sockets in its acting face and a peripheral groove therein of reduced width and depth as compared with the sockets and passing centrally therethrough; balls seating in the sockets; and a member having teeth entering the groove for extended engagement with the balls.

2. Gearing comprising a wheel having a beveled socketed face, rollers seating loosely in the sockets, a stationary ring embracing the wheel at the base of its beveled face, a shell or casing secured to said ring, and extending over the socketed surface of the wheel and confining the rollers therein, said casing having an opening of limited area, and a wheel having teeth which enter said opening for engagement with the rollers, substantially as described.

3. The combination with gearing, comprising a member having sockets in its acting face, rollers loosely seated therein, and a member having teeth engaging said rollers; of a retainer for said rollers embracing the first-named member, and a casing covering both members and engaged with said retainer.

4. The combination with gearing comprising a wheel having a series of sockets in its acting face, rollers loosely seated in said sockets, and a wheel having teeth engaging said rollers; of a casing for said wheels, and a retainer for said rollers engaged with the casing.

5. The combination with gearing comprising a wheel having a series of sockets in its acting face, rollers loosely seated in said sockets, and a wheel having teeth engaging said rollers; of a casing for said wheels having longitudinal grooves in the portion surrounding the roller-carrying wheel, and a retainer embracing the latter and having projections engaging the grooves in the casing.

In testimony whereof I affix my signature in presence of two witnesses.

HENRY B. KEIPER.

Witnesses:
 C. D. MEYERS,
 HARVEY B. LUTZ.